United States Patent Office 3,152,139
Patented Oct. 6, 1964

3,152,139
CERTAIN AMINOISOXAZOLONE DERIVATIVES
Frederick Leonard and Kjell Undheim, Yonkers, N.Y., assignors to Geigy Chemical Corporation, Greenburgh, N.Y., a corporation of Delaware
No Drawing. Filed Oct. 17, 1961, Ser. No. 145,756
6 Claims. (Cl. 260—307)

This invention relates to certain novel derivatives of aminoisoxazolone, and more particularly to derivatives of 5-amino-3-isoxazolone which possess valuable pharmacological and antibacterial properties and are useful as pharmaceutical agents. This invention pertains also to processes for their manufacture.

More specifically, this invention resides in 5-amino-4-unsubstituted or alkyl-, cycloalkyl- or aryl-substituted-3-isoxazolone compounds which may be represented by the following general formula:

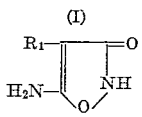
(I)

In this formula $R_1$ designates hydrogen, alkyl—particularly, lower alkyl; cycloalkyl—particularly, cyclopentyl and cyclohexyl; or aryl—particularly, phenyl and mono- or poly-substituted phenyl, as for example, lower alkyl-, hydroxy-, lower alkoxy-, halo-, amino- or nitro-substituted phenyl or methylenedioxy-substituted phenyl and $R_2$ stands for hydrogen, alkyl—particularly, lower alkyl; cycloalkyl—particularly, cyclopentyl and cyclohexyl; aralkyl—particularly, benzyl; or aryl—particularly, phenyl and mono- or poly-substituted phenyl, as for example, lower alkyl-, hydroxy-, lower alkoxy-, halo-, amino- or nitro-substituted phenyl or methylenedioxy substituted phenyl.

The term "lower alkyl" as used herein per se and as included in the term "lower alkoxy" means saturated monovalent aliphatic radicals of the general formula $-C_nH_{2n+1}$ wherein $n$ designates an integer of less than five and is inclusive of both straight-chain and branched-chain radicals.

The compounds of this invention can be conveniently synthesized by the reaction of a lower alkyl ester of an unsubstituted or an alkyl-, cycloalkyl-, aralkyl- or aryl substituted cyanoacetate with hydroxylamine under alkaline conditions.

More specifically, the subject compounds may be made by adding the desired lower alkyl ester of an unsubstituted or alkyl-, cycloalkyl- or aryl-substituted cyanoacetate dissolved in a lower alkanol, such as methanol, ethanol, isopropanol, etc. with ethanol being preferred, to the stirred mixture of hydroxylamine hydrochloride and a sodium (lower) alkoxide at a temperature of from about −5° C. to about 5° C., stirring the resulting reaction mixture for from 1 to 3 hours within said temperature range and then at room temperature from about 12 to 20 hours and subsequently isolating and purifying the desired final compounds in accordance with methods well known to a man skilled in the art.

The synthesis of these compounds may be graphically illustrated by the following equation:

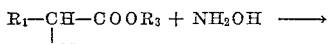

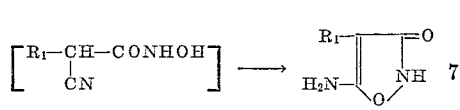

wherein $R_1$ is as defined hereinabove, and $R_3$ represents lower alkyl.

The starting materials are either commercially available, e.g., hydroxylamine hydrochloride and the unsubstituted cyanoacetate ester or can be synthesized according to known procedures. For instance, the alkyl-, cycloalkyl- and aralkyl-substituted cyanoacetate esters can be made from the corresponding alkyl, cycloalkyl, or aralkyl halides, aldehydes or ketones and cyanoacetate. The arylcyanoacetate esters can be obtained by carbethoxylation with diethyl carbonate of the requisite arylacetonitriles which can be made by well-known methods.

As stated above, the subject compounds possess valuable pharmacological and antibacterial properties. Thus, for instance, they are useful as sedatives, stimultants, hypoglycaemic agents and tuberculostats.

The above-described novel compounds and the methods for their preparation may be exemplified more fully by the following illustrative examples. The temperatures therein are given in degrees centigrade.

EXAMPLE I

5-Amino-3-Isoxazolone

Ethyl cyanoacetate (45.2 g.) in 100 ml. of ethanol was added with stirring at −5 to 0° to the mixture resulting from 28.0 g. of hydroxylamine hydrochloride and 43.2 g. of sodium methoxide in 1300 ml. of ethanol. The resultant mixture was stirred at 0° for 2 hours and then at room temperature overnight. The sodium chloride was filtered off, the filtrate evaporated to dryness and the residue dissolved in 200 ml. of water, the solution extracted with ether and the aqueous solution brought to pH 5 with hydrochloric acid. Then the solution was evaporated to dryness and the residue dried and extracted with boiling ethanol (3 x 150 ml.). Addition of petroleum ether to the alcohol extract slowly precipitated the desired isoxazolone as pale brown prismatic crystals (12.1 g.; 30%); M.P. 145–150°. Recrystallizations from ethanol-petroleum ether and dioxan raised the M.P. to 155–156° (dec.).

EXAMPLE II

5-Amino-4-Methyl-3-Isoxazolone

Ethyl methylcyanoacetate (65.0 g.) in 100 ml. of ethanol was added with stirring at −5 to 0° to the mixture resulting from 37.0 g. of hydroxylamine hydrochloride and 60.0 g. of sodium methoxide in 1200 ml. of ethanol. The mixture was stirred at 0° for 2 hours and then at room temperature overnight. The sodium chloride was filtered off, the filtrate evaporated to dryness, the residue dissolved in 100 ml. of water and the solution washed with ether (2 x 200 ml.) and saturated with carbon dioxide. The precipitate formed was all inorganic material so the filtrate was neutralized with hydrochloric acid. The desired isoxazolone precipitated as a white compound (22.5 g.; 39%); M.P. 170–173°. After recrystallization from ethanol-petroleum ether and dioxan it had a M.P. of 171–172°.

EXAMPLE III

5-Amino-4-Ethyl-3-Isoxazolone

Ethyl ethylcyanoacetate (70.0 g.) in 100 ml. of ethanol was added with stirring at −5 to 0° to the mixture resulting from 35.0 g. of hydroxylamine hydrochloride and 54.0 g. of sodium methoxide in 1200 ml. of ethanol. The mixture was stirred at 0° for 1.5 hours and then at room temperature overnight. The sodium chloride was filtered off, the filtrate evaporated to dryness, the residue dissolved in 250 ml. of water and the solution washed with ether (2 x 200 ml.) and saturated with carbon dioxide. White solid precipitated (29.5 g.); M.P. 105–107° (dec.).

Neutralization of the filtrate and standing furnished another crop of white crystalline material (21.5 g.); M.P. 105–108°. One recrystallization of these materials from ethyl acetate furnished the desired compound as white needles (42.2 g., 66%); M.P. 148–150°. Further recrystallizations from ethyl acetate raised the M.P. to 149–150° (dec.).

EXAMPLE IV

5-Amino-4-n-Propyl-3-Isoxazolone

Ethyl n-propylcyanoacetate (117.0 g.) in 200 ml. of ethanol was added with stirring at −5 to 0° to the mixture resulting from 52.0 g. of hydroxylamine hydrochloride and 81.0° g. of sodium methoxide in 1800 ml. of ethanol. The resultant mixture was stirred at 0° for 2 hours and then at room temperature overnight. The sodium chloride was filtered off, the filtrate evaporated to dryness, the residue dissolved in 250 ml. of water and the solution washed with ether (2 x 200 ml.) and saturated with carbon dioxide. The precipitate formed was all inorganic material so the filtrate was neutralized with hydrochloric acid. The desired isoxazolone precipitated as a white compound (31.0 g., 29%); M.P. 137–139°. One recrystallization from ethyl acetate-petroleum ether did not change the melting point. Recrystallization from dioxan gave colorless flakes (white on drying); M.P. 123–125°.

EXAMPLE V

5-Amino-4-Isopropyl-3-Isoxazolone

Following the condensation procedure described in preceding examples, 78.0 g. of ethyl isopropylcyanoacetate in 100 ml. of ethanol was reacted with 35.0 g. of hydroxylamine hydrochloride admixed with 54.0 g. of sodium methoxide in 1200 ml. of ethanol to give 23.0 g. (32%) of the desired compound as white prisms, M.P. 128–130°, which was raised upon further recrystallization from ethyl acetate to 130–131°.

In the same manner 5-amino-4-cyclopentyl-3-isoxazolone and 5-amino-4-cyclohexyl-3-isoxazolone are prepared from, respectively, ethyl cyclopentylcyanoacetate and hydroxylamine and ethyl cyclohexylcyanoacetate and hydroxylamine.

EXAMPLE VI

5-Amino-4-Benzyl-3-Isoxazolone

Ethyl benzylcyanoacetate (38.0 g.), dissolved in 100 ml. of ethanol was added to a stirred suspension of 14.0 g. of hydroxylamine hydrochloride and 21.6 g. of sodium methoxide in 600 ml. of ethanol at −5 to 0°. The resultant mixture was stirred at 0° for 3 hours and then at room temperature overnight. The sodium chloride was removed by filtration, the filtrate evaporated to dryness at reduced pressure and the residue triturated with benzene and then dissolved in 200 ml. of water. The aqueous solution, after treatment with charcoal and saturation with carbon dioxide, precipitated the white isoxazolone (28.5 g., 80%); M.P. 147–148°. It crystallized from ethyl acetate in white flakes; M.P. 147–148°.

EXAMPLE VII

5-Amino-4-Phenyl-3-Isoxazolone

Ethyl phenylcyanoacetate (37.8 g.) in 100 ml. of ethanol was added to the stirred mixture resulting from 14.0 g. of hydroxylamine hydrochloride and 21.6 g. of sodium methoxide in 600 ml. of ethanol at −5 to 0°. The resultant mixture was stirred at 0° for two hours and then at room temperature overnight. The sodium chloride was filtered off, the filtrate evaporated to dryness, the residual gum dissolved in 200 ml. of water, the solution extracted with ether (4 x 75 ml.) and the aqueous layer saturated with carbon dioxide. A dark yellow solid precipitated slowly (15.5 g., 44%); M.P. 168–171° (dec.). Recrystallization of this material from ethanol furnished as bright yellow flakes, 10.1 g. of the desired compound; M.P. 178–179° (dec.).

EXAMPLE VIII

5-Amino-4-(3,4-Methylenedioxyphenyl)-3-Isoxazolone

Ethyl 3,4-methylenedioxyphenylcyanoacetate (93.2 g.), dissolved in 200 ml. of ethanol, was added to the stirred mixture resulting from 28.0 g. of hydroxylamine hydrochloride and 48.6 g. of sodium methoxide at −5 to 0°. The resultant mixture was stirred at 0° for two hours and then at room temperature overnight. The sodium chloride was filtered off, the filtrate evaporated to dryness and the residual brownish solid dissolved in 400 ml. of water. The solution was extracted with ether (3 x 200 ml.) and the aqueous layer saturated with carbon dioxide when a pale brown solid slowly precipitated (22.0 g., 25%); M.P. 171–173° (dec.). Recrystallization from ethanol afforded the desired compound as a fine, pale yellow crystalline solid (17.1 g.); M.P. 184–185°.

In the same manner the following 5-amino-4-aryl-3-isoxazolones are prepared:

5-amino-4-p-tolyl-3-isoxazolone
5-amino-4-m-tolyl-3-isoxazolone
5-amino-4-(2,4-dimethylphenyl)-3-isoxazolone
5-amino-4-(3,4-dimethylphenyl)-3-isoxazolone
5-amino-4-m-methoxyphenyl-3-isoxazolone
5-amino-4-p-methoxyphenyl-3-isoxazolone
5-amino-4-(2,4-dimethoxyphenyl)-3-isoxazolone
5-amino-4-(3,4-dimethoxyphenyl)-3-isoxazolone
5-amino-4-p-chlorophenyl-3-isoxazolone
5-amino-4-m-chlorophenyl-3-isoxazolone
5-amino-4-p-bromophenyl-3-isoxazolone
5-amino-4-m-bromophenyl-3-isoxazolone, etc.

EXAMPLE IX

5-Amino-4-p-Hydroxyphenyl-3-Isoxazolone (a) *p-Benzyloxybenzyl alcohol.*—p-Benzyloxybenzaldehyde (1110.0 g.), dissolved in a solution of 750 ml. of formaldehyde and 1000 ml. of methanol, was added with stirring to a solution of 1260.0 g. of potassium hydroxide in 1800 ml. of methanol at such a rate that only weak external cooling was required to keep the temperature in the reaction mixture at 60°. After the addition was completed the mixture was heated for a further two hours at 70°, cooled down, poured into 5 liters of ice-water. The solid which formed was filtered off, dried and recrystallized once from benzene-petroleum ether. Yield: 657.0 g. (56%); M.P. 84–86°.

(b) *p-Benzyloxybenzylchloride.*—To the warm, stirred solution of 348.0 g. of p-benzyloxybenzyl alcohol in 1000 ml. of anhydrous benzene was added dropwise with stirring 298.0 g. of thionyl chloride. The resultant solution was refluxed for 2 hours after the addition was complete. Then the solution was treated with charcoal, then concentrated to about half its volume and petroleum ether added when part of the benzyl chloride was precipitated (220 g.); M.P. 77–80°. A second crop was obtained on standing (155.0 g.); M.P. 75–77°, giving a total yield of 98%.

(c) *p-Benzyloxybenzyl cyanide.*—p-Benzyloxybenzyl chloride (208.0 g.) was added portionwise with stirring to a solution of 60.0 g. of sodium cyanide in 400 ml. of DMSO at such a rate that the temperature was kept at 80–85°. The addition took 40 minutes. The mixture was heated at 80–90° for another 90 minutes, cooled down, poured into 1000 ml. of crushed ice. The solid which formed was filtered off, washed well with water and dissolved in ether. The ethereal solution was dried over magnesium sulfate, then evaporated and the residual oil distilled to give as a colorless liquid which solidified upon cooling 171.1 g. (77%) of the desired compound; B.P. 170–173°/0.25 mm.

(d) *Ethyl p-benzyloxyphenylcyanoacetate.*—Toluene (400 ml.) was added dropwise over two hours to a stirred solution of 160.0 g. of 4-benzyloxybenzyl cyanide, 40.5 g. of sodium methoxide, 500 ml. of diethyl carbonate, and 150 ml. of toluene while the rate of heating was such that the rate of distillation from the reaction mixture was equal to the rate of the addition of toluene. The heating was continued for a further hour at reflux temperature. Then the mixture was stored at room temperature overnight. Water (600 ml.) was added, the oily suspension extracted with ether (2 x 150 ml.). Acetic acid (70 ml.) was added to the aqueous solution and the resultant suspension extracted with ether (4 x 250 ml.). The ether extract was dried over magnesium sulfate, evaporated and the residue distilled to give as pale, yellow liquid 78.6 g. (37%) of the desired compound; B.P. 202°/0.6 ml.

(e) *5-amino - 4 - p - benzyloxyphenyl-3-isoxazolone.*—Ethyl p-benzyloxyphenylcyanoacetate (74.0 g.) in 100 ml. of ethanol was added at —5 to 0° to the stirred mixture resulting from 17.5 g. of hydroxylamine hydrochloride and 27.0 g. of sodium methoxide in 700 ml. of ethanol. The resultant mixture was stirred at 0° for 2 hours, then at room temperature overnight. The sodium chloride was filtered off, the filtrate evaporated, the residue suspended in 400 ml. of water, the insoluble material extracted into ether and the aqueous solution saturated with carbon dioxide. The cream colored isoxazolone was precipitated. One recrystallization from dioxan gave fine cream colored flakes (11.1 g., 16%); M.P. 174–176°. Further recrystallizations from dioxan raised the M.P. to 184–186°.

In a similar manner, 5-amino-4-p-aminophenyl-3-isoxazolone as well as the positional isomers of both 5-amino-4-p-hydroxyphenyl-3-isoxazolone and 5-amino-4-p-aminophenyl-3-isoxazolone can be obtained.

What is claimed is:
1. A compound of the formula

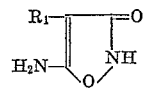

wherein
$R_1$ is a member of the group consisting of hydrogen, lower alkyl, phenyl and lower alkyl-, hydroxy-, lower alkoxy-, chloro-, bromo-, amino-, and nitro- mono- and disubstituted phenyl and methylenedioxy-substituted phenyl.
2. 5-amino-3-isoxazolone.
3. 5-amino-4-ethyl-3-isoxazolone.
4. 5-amino-4-propyl-3-isoxazolone.
5. 5-amino-4-phenyl-3-isoxazolone.
6. 5 - amino-4-(3,4-methylenedioxyphenyl)-3-isoxazolone.

References Cited in the file of this patent

Burger, Medicinal Chemistry (New York, 1960), pp. 42–3.